United States Patent
Shundo et al.

(10) Patent No.: US 11,254,418 B2
(45) Date of Patent: Feb. 22, 2022

(54) TILTROTOR CONTROLS SHIELD

(71) Applicant: Textron Innovations Inc., Providence, RI (US)

(72) Inventors: Ken Shundo, Keller, TX (US); Michael Dearman, Weatherford, TX (US); Terry Thompson, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 251 days.

(21) Appl. No.: 16/370,368

(22) Filed: Mar. 29, 2019

(65) Prior Publication Data

US 2020/0307773 A1 Oct. 1, 2020

(51) Int. Cl.
| | | |
|---|---|---|
| *B64C 11/14* | (2006.01) | |
| *B64C 29/00* | (2006.01) | |
| *B64D 33/02* | (2006.01) | |
| *B64D 45/00* | (2006.01) | |
| *F02C 7/055* | (2006.01) | |

(52) U.S. Cl.
CPC .......... *B64C 11/14* (2013.01); *B64C 29/0033* (2013.01); *B64D 2033/022* (2013.01); *B64D 2045/0095* (2013.01); *F02C 7/055* (2013.01)

(58) Field of Classification Search
CPC ...... B64D 2033/022; B64D 2045/0095; B64C 11/14; B64C 11/02; B64C 29/0033; F02C 7/05; F02C 7/055
USPC ......... 416/94, 245 R, 196 A, 196 R; 55/306; 60/39.092

See application file for complete search history.

(56) References Cited

U.S. PATENT DOCUMENTS

| | | | | |
|---|---|---|---|---|
| 1,361,399 A * | 12/1920 | Mott | ....................... | B64C 11/04 416/196 R |
| 1,927,921 A * | 9/1933 | Courtney | ................ | B64C 11/14 416/94 |
| 2,018,012 A * | 10/1935 | Chilton | ................... | B64C 11/14 416/94 |
| 2,060,859 A * | 11/1936 | Flynt | ........................ | B64C 3/00 52/84 |
| 2,329,606 A * | 9/1943 | Goodman | ............... | B64C 11/14 416/94 |
| 3,121,545 A * | 2/1964 | Meletiou | ................ | B64D 33/02 244/53 B |
| 6,089,824 A * | 7/2000 | Soares | ................... | B64D 33/02 415/121.1 |
| 6,358,014 B1 * | 3/2002 | Chou | ........................ | F02C 7/04 416/245 R |
| 7,422,611 B2 * | 9/2008 | Marinella Pavlatos | ..................... | B01D 45/12 55/306 |

(Continued)

*Primary Examiner* — Woody A Lee, Jr.
*Assistant Examiner* — Wesley Le Fisher
(74) *Attorney, Agent, or Firm* — Whitaker Chalk Swindle & Schwartz PLLC; Enrique Sanchez, Jr.

(57) ABSTRACT

A tiltrotor controls shield having a blade or wire substructure under a fragile spinner fairing improves bird strike durability. The present disclosure discloses a spinner wind fairing with a shield structure disposed thereunder for providing protection to the proprotor assembly components. The shield structure can segment a projectile, such as a bird, that penetrates the spinner fairing into a series of smaller and lower energy elements spread across a wider area, such that the rotor components can withstand the impact of the smaller elements without damage.

17 Claims, 8 Drawing Sheets

(56) References Cited

U.S. PATENT DOCUMENTS

2014/0352795 A1* 12/2014 Kline ..................... F02C 7/05
137/15.1

* cited by examiner

TILTROTOR CONTROLS SHIELD

BACKGROUND

1. Field of the Invention

The present disclosure is generally related to aircraft protection systems, and more specifically to in-flight impact protection systems for aircraft.

2. Background of the Invention and Description of Related Art

Current birdstrike provisions involve structural spinner fairings. These spinner (airings absorb or deflect the energy from a single impact at any location requiring a sandwich panel with constituent materials capable of better energy dispersion than fairings designed only for aerodynamic loads. In addition to the cost increase these can result in an increase in structural requirements to the substructure.

Traditional bird strike spinners are constricted of stiff, heavy, and expensive combinations of materials that absorb the energy of a strike from a large bird protecting the structure beneath. This additional weight and stiffness can drive massive loads into the smaller spinner spoke, which can damage the underlying components. As a composite part, the traditional spinner can be expensive to fabricate, especially at a thicknesses required to withstand even moderate forces. Additionally, the traditional spinner fairings typically break if struck with forces exceeding the design.

SUMMARY

The present disclosure teaches technical advantages of a tiltrotor controls shield having a blade or wire substructure under a fragile spinner fairing that improves bird strike durability. Instead of attempting to reinforce and create a spinner fairing strong enough to withstand a large impact, the present disclosure instead discloses a spinner wind fairing with a shield structure disposed thereunder for providing protection to proprotor assembly components. The shield structure can segment a projectile, such as a bird, that penetrates the spinner fairing into a series of smaller and lower energy elements spread across a wider area, such that the rotor components can withstand the impact of the smaller elements without damage.

In one exemplary embodiment, a wire tiltrotor controls shield can include: a base having a flange on a first end of the base; a wire cap disposed on a second end of the base; a circumferential member can be disposed at least in part around the base; and a plurality of wire segments operably coupled between the wire cap and the circumferential member, and configured to separate a projectile into a plurality of elements. The wire tiltrotor controls shield can further include a gusset coupled to the base and the flange. The base can be a hollow structure and can have an opening. The flange can be configured to be coupled to an aircraft structure. The circumferential member can be configured to be coupled to on aircraft structure. The wire shield can be made of metal (such as aluminum or steel) or other suitable material. The circumferential member can include a plurality of member elements, each member element disposed along a particular are of a circumference around the base.

In another exemplary embodiment, a bladed tiltrotor controls shield can include: a blade cap having a center point in a first plane; a circumferential member having a center point in a second plane; and a plurality of blade arms operably coupled between the blade cap and the circumferential member and configured to separate a projectile into a plurality of elements. The bladed arms can have one or more sharp edges. The blade cap can include spokes that extend radially from the blade cap center point to a blade cap ring. The spokes can have one or more sharp edges. The blade arms can have at least three edges. The circumferential member can be configured to be coupled to an aircraft structure. The bladed shield can be made of metal (such as aluminum or steel) or other suitable material (such as Kevlar®). The circumferential member can include a plurality of member elements, each member element disposed along a particular arc of a circumference around the base.

In another exemplary embodiment, a tiltrotor controls shield system can include: a spinner fairing; a proprotor assembly; and a tiltrotor controls shield coupled to the proprotor assembly and covered by the spinner fairing, the tiltrotor controls shield configured to separate a projectile into as plurality of elements. The tiltrotor controls shield can include a plurality of wire segments. The tiltrotor controls shield can also include a plurality of bladed arms. The tiltrotor controls shield includes a plurality of wire segments and includes a plurality of bladed arms.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1A:
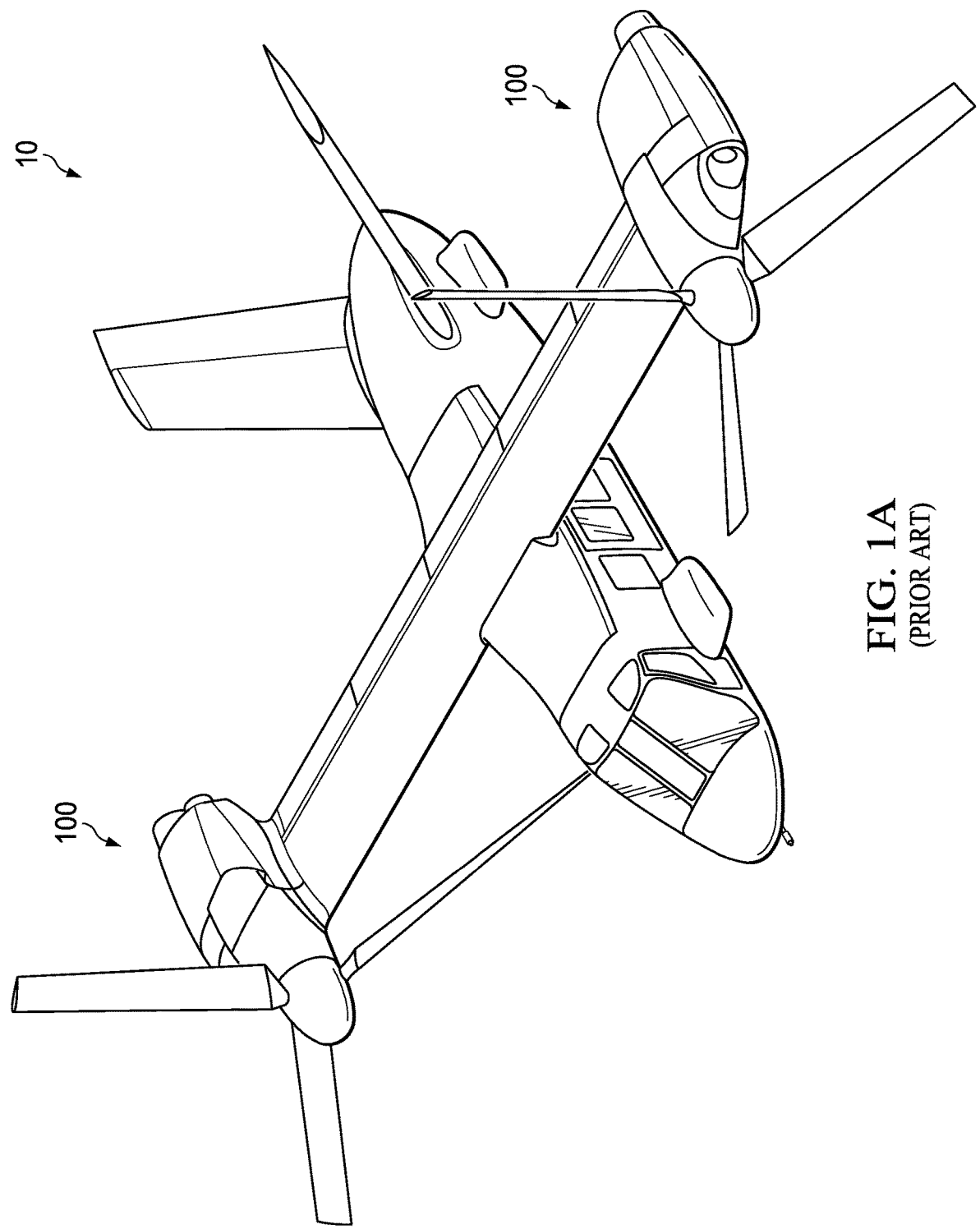
FIG. 1A is a perspective view of a tiltrotor aircraft, in accordance with the prior art.

FIG. 1A is a perspective view of a tiltrotor aircraft, generally designated as 10, in accordance with the prior art. Located proximate the outboard ends of wing are proprotor assemblies 100 that are rotatable relative to the fuselage.

Proprotor assemblies 100 each house a portion of the drive system that can be used to rotate rotor blades. The proprotor assembly 100 can rotate relative to the fuselage of the aircraft to convert between a helicopter mode position (perpendicular to the fuselage) for vertical flight, and an airplane mode position (parallel to the fuselage) for horizontal flight.

Figure 1B:
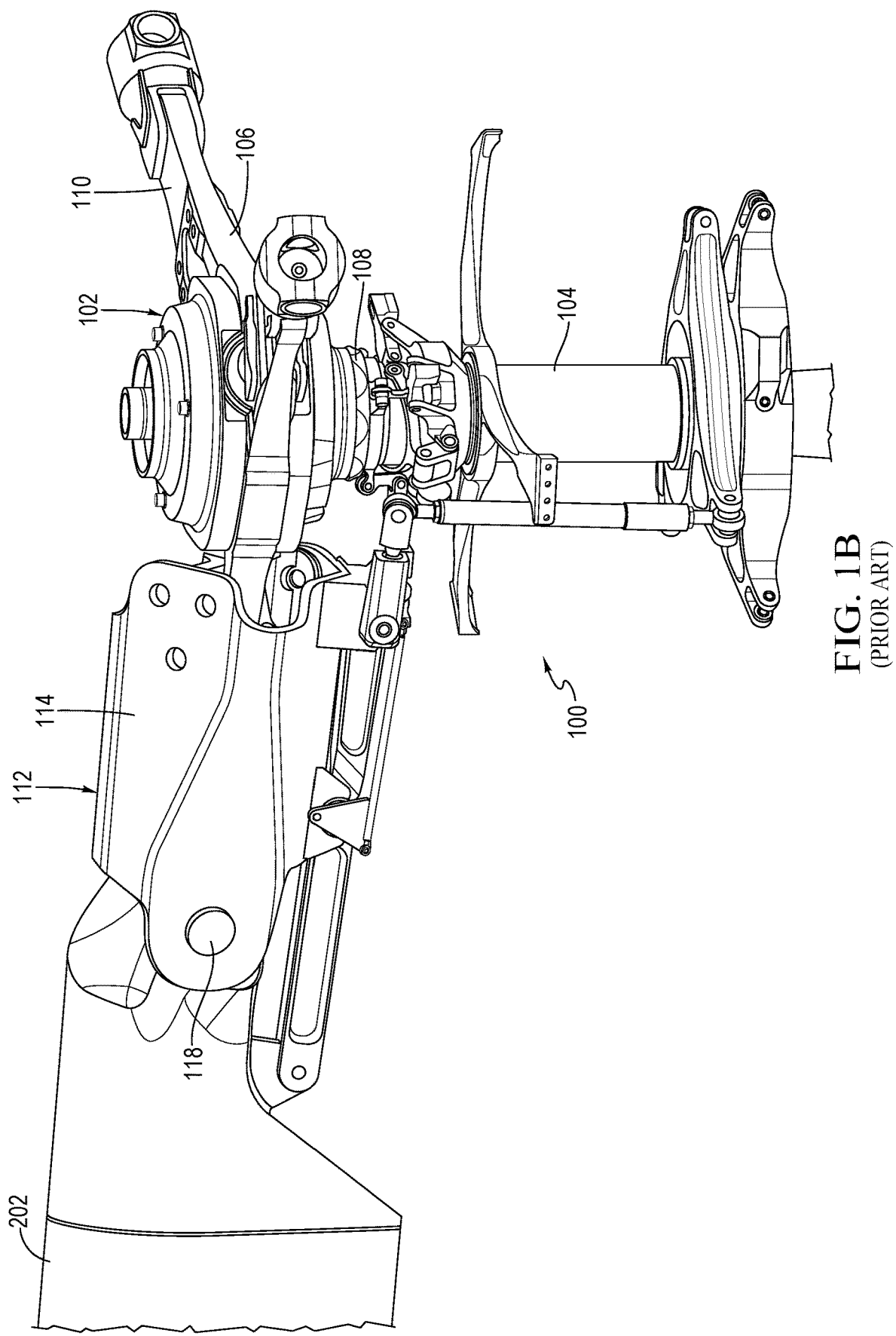
FIG. 1B is an perspective view of a proprotor assembly for a tiltrotor aircraft, in accordance with the prior art.

FIG. 1B is an perspective view of a proprotor assembly, generally designated as 100, for a tiltrotor aircraft, in accordance with the prior art. Each proprotor assembly 100 can include a plurality of rotor blades 202 and components operable to rotate, feather, and/or fold the rotor blades 202. As disclosed in more detail in U.S. Publication No. US 2017/144746A1, assigned to Bell Helicopter Textron, Inc., the contents of which are hereby incorporated in their entirety, a rotor assembly 102 can be depicted as a gimbal-mounted, three-bladed rotor assembly 102 having a gimballing degree of freedom relative to a mast 104. Rotor assembly 102 can include a rotor hub 106 that can be coupled to and operable to rotate with mast 104. Rotor hub 106 can have a conical receptacle 108 extending from a lower portion thereof. Rotor hub 106 can include three arms 110 each of which support a rotor blade assembly 112. Each rotor blade assembly 112 can also include a cuff 114 and a rotor blade 202 that can be pivotably coupled to cuff 114 by a connection member depicted as pin 118. The proprotor assembly 100 can include many other components that can be damaged by a bird strike, such as fairings, mast nuts, pitch links, pitch horns, blade locks, connecting rods, etc. Accordingly, many alternative configurations, components, and implementations are possible.

Figure 2:
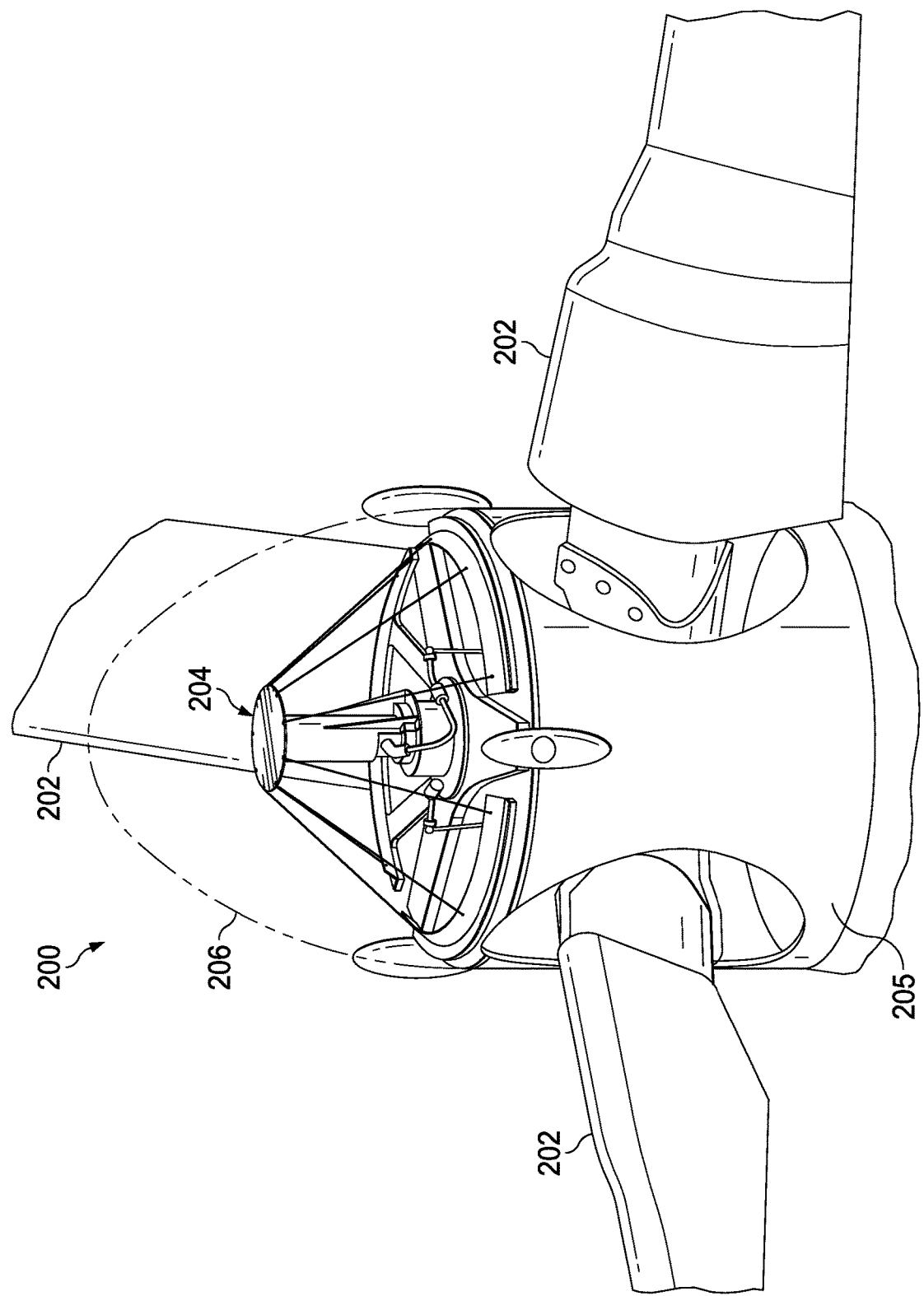
FIG. 2 is a perspective view of a proprotor assembly having a wire tiltrotor controls shield, in accordance with an embodiment of the present disclosure.

FIG. 2 is a perspective view of a proprotor assembly having a wire tiltrotor controls shield, generally designated as 200, in accordance with an embodiment of the present disclosure. The proprotor assembly can include a rotor blade 202, a wire tiltrotor controls shield 204, a transmission fairing 205, and a spinner fairing 206. The spinner fairing 206 is operably coupled to the transmission faring 205, such that the rotor blades 202, the transmission fairing 205, and the spinner fairing 206 rotate together. The wire tiltrotor controls shield 204 can be coupled to the transmission fairing (via, e.g., a circumferential member) and/or the mast nut (via e.g., a base), with the spinner fairing 206 disposed over the wire tiltrotor controls shield 204 and coupled to the transmission fairing 205. Alternatively, the wire tiltrotor controls shield 204 can be coupled to the spinner fairing 206.

In operation, if a projectile (such as a bird) impacts the spinner fairing 206 with enough force to penetrate the spinner fairing 206, the projectile proceeds through the spinner fairing 206 and strikes the wire tiltrotor controls shield 204. The wire segments of the wire tiltrotor controls shield 204 can be spaced (such as 1-5 inches apart at the wire cap) so that when the projectile strikes one or more of the wire segments, the wire segment can separate the projectile into a series of smaller, lower energy objects spread across a wider area. The wire segments can be spaced based upon the specific application. For example, larger aircraft components can withstand greater impact forces and can have greater spacing between wire segments (e.g., 2-3 inches apart at the wire cap). However, smaller aircraft components can withstand lower impact forces that the larger aircraft components, as such the spacing between wire segments must be closer than the larger aircraft components (e.g., 1-2 inches apart at the wire cap). The separated objects can be ejected during flight by the rotational forces or removed by maintenance personnel upon repair of the spinner fairing 206.

Figure 3:
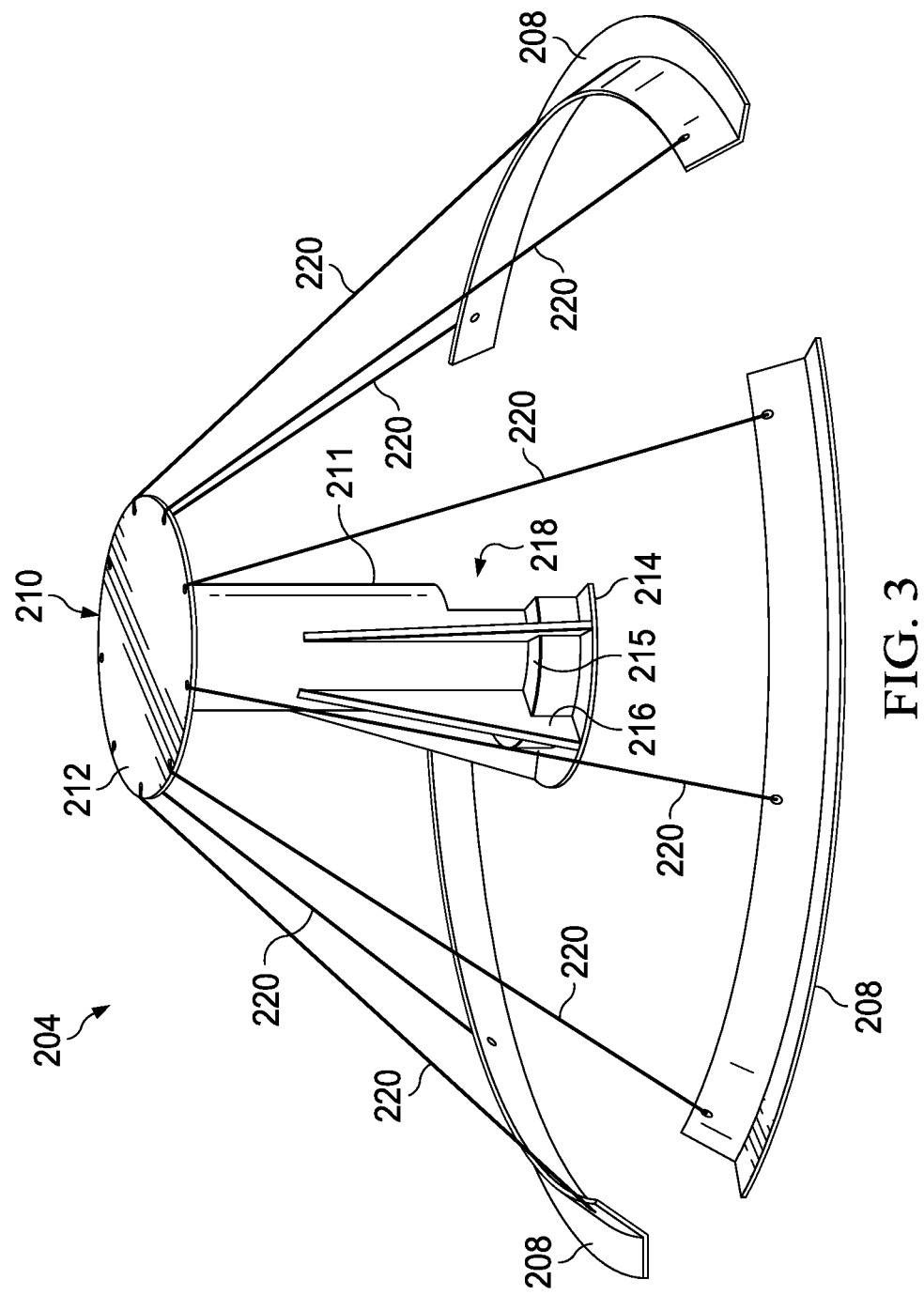
FIG. 3 is a perspective view of a wire tiltrotor controls shield, in accordance with an embodiment of the present disclosure.

FIG. 3 is a perspective view of a wire tiltrotor controls shield, generally designated as 204, in accordance with an embodiment of the present disclosure. The wire tiltrotor controls shield 204 can include a circumferential member 208, a plurality of wire segments 220, and a base 210. The circumferential member 208 can be unitary or segmented into a plurality of member elements. The circumferential member 208 can be circular, rectangular, triangular, or other suitable shape. The circumferential member 208 can include a circumferential member flange to removably couple the wire tiltrotor controls shield 204 to an aircraft structure. The circumferential member 208 can be made of metal or other suitable material. The circumferential member 208 can have a plurality of holes adapted to receive and engage one or more wire segments 220. The circumferential member 208 can be disposed at least in part around the base 210, such that there is sufficient space for a projectile penetrating a spinner fairing to contact with the wire segments 220.

The base 210 can include a vertical member 211, a wire cap 212, a flange 214, and a gusset 216. The vertical member 211 can be disposed between the flange 214 and the wire cap 212. The gusset 216 can be coupled to the vertical member 211 and the flange 214 to provide additional structural support to the vertical member 211. The vertical member 211 can include one or more protrusions to accommodate aircraft structures (e.g., rotor components). Additionally, the vertical member 211 can include one or more openings 218 to accommodate rotor component placement. The wire cap 212 can have a plurality of holes adapted to receive and engage one or more wire segments 220. The base 210 can be made of metal or other suitable material. The wire cap 212 and the circumferential member 208 can be positioned relative to each other to maintain a tension in the wire segments 220, such that the wire segments 220 can separate a projectile into a series of smaller, lower energy objects spread across a wider area. The height and width of the wire tiltrotor controls shield 204 can vary based upon the application, fairing dimensions, or other considerations.

A plurality of wire segments 220 can be operably coupled between the wire cap 212 and the circumferential member 208, and configured to separate a projectile into a plurality of elements. The wire segments 220 can be made of metal or other suitable material. The length of the segments can vary based upon the distance between the circumferential member and the wire cap.

Figure 4:
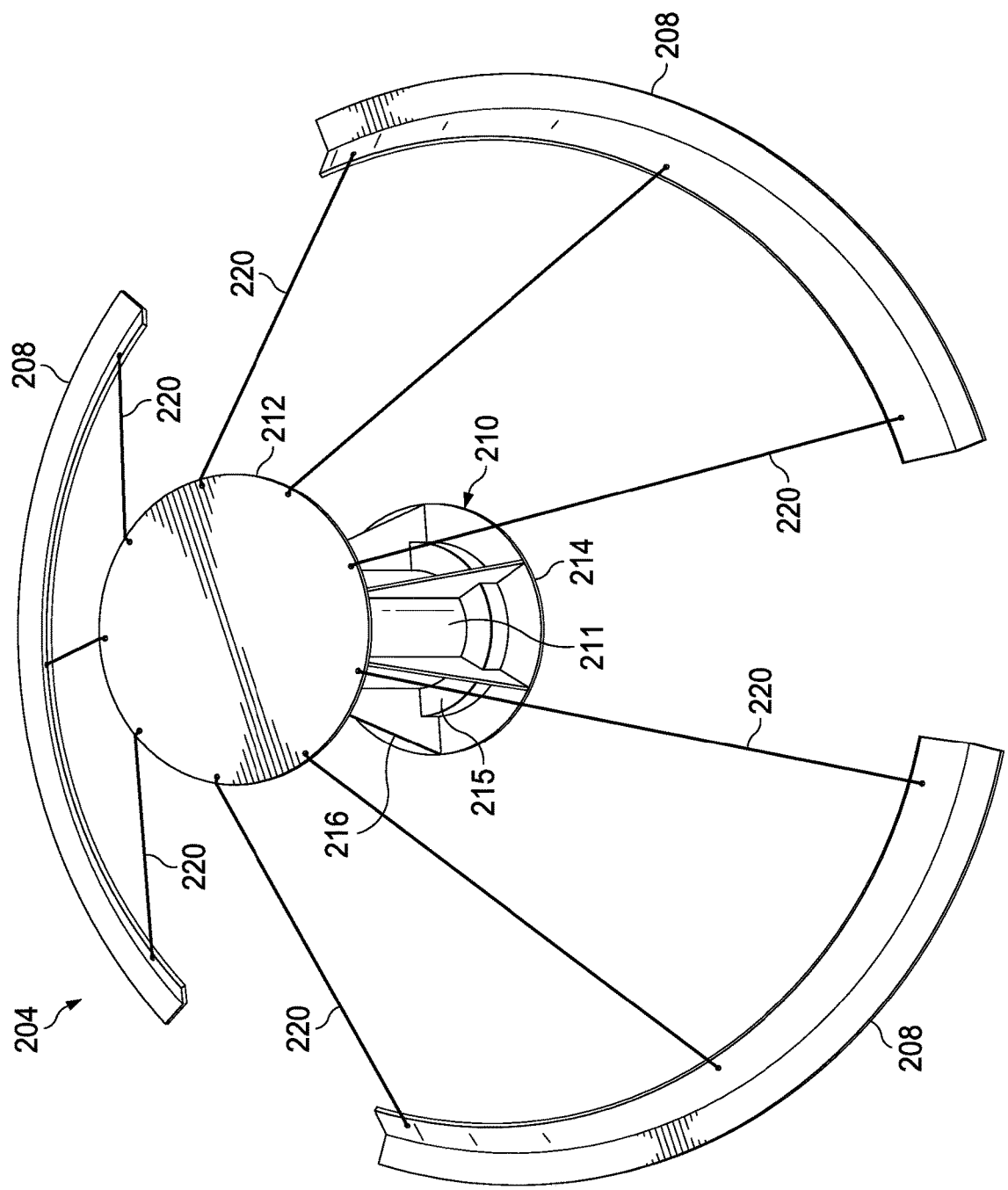
FIG. 4 is a top, perspective view of a wire tiltrotor controls shield, in accordance with an embodiment of the present disclosure.

FIG. 4 is a top, perspective view of a wire tiltrotor controls shield, generally designated as 204, in accordance with an embodiment of the present disclosure. In one exemplary embodiment, the protrusion 215 can have a shape similar to the vertical member 211, but with different dimensions. In another exemplary embodiment, the protrusion 215 can take any shape necessary to contour around rotor assembly components. The protrusion 215 and/or the flange 214 can be coupled to rotor assembly components to secure the wire tiltrotor controls shield 204 to the rotor assembly. Alternatively the wire tiltrotor controls shield 204 can be formed without the flange 214. In such an embodiment, the gussets 216 can be coupled to the vertical member 211 and the protrusion 215 to provide structural support to the base 210. A plurality of holes can be disposed in intervals around the wire cap 212, or at any location suitable for the specific application. For example, if a projectile has a greater probability of impacting the rotor assembly on one side (due to positioning, obstructions, etc.), the holes can be disposed only on that side, with a single member element of the circumferential member 208 disposed on that side, and wire elements 220 coupled between the wire cap 212 and the circumferential member 208 disposed along that side. In other words, the wire tiltrotor controls shield 204 allows system pass-throughs to provide clearance for dynamic members. In this way, any sector, or groups of sectors of the rotor assembly can be selected to dispose a member element of the circumferential member 208 and wire elements 220.

Figure 5:
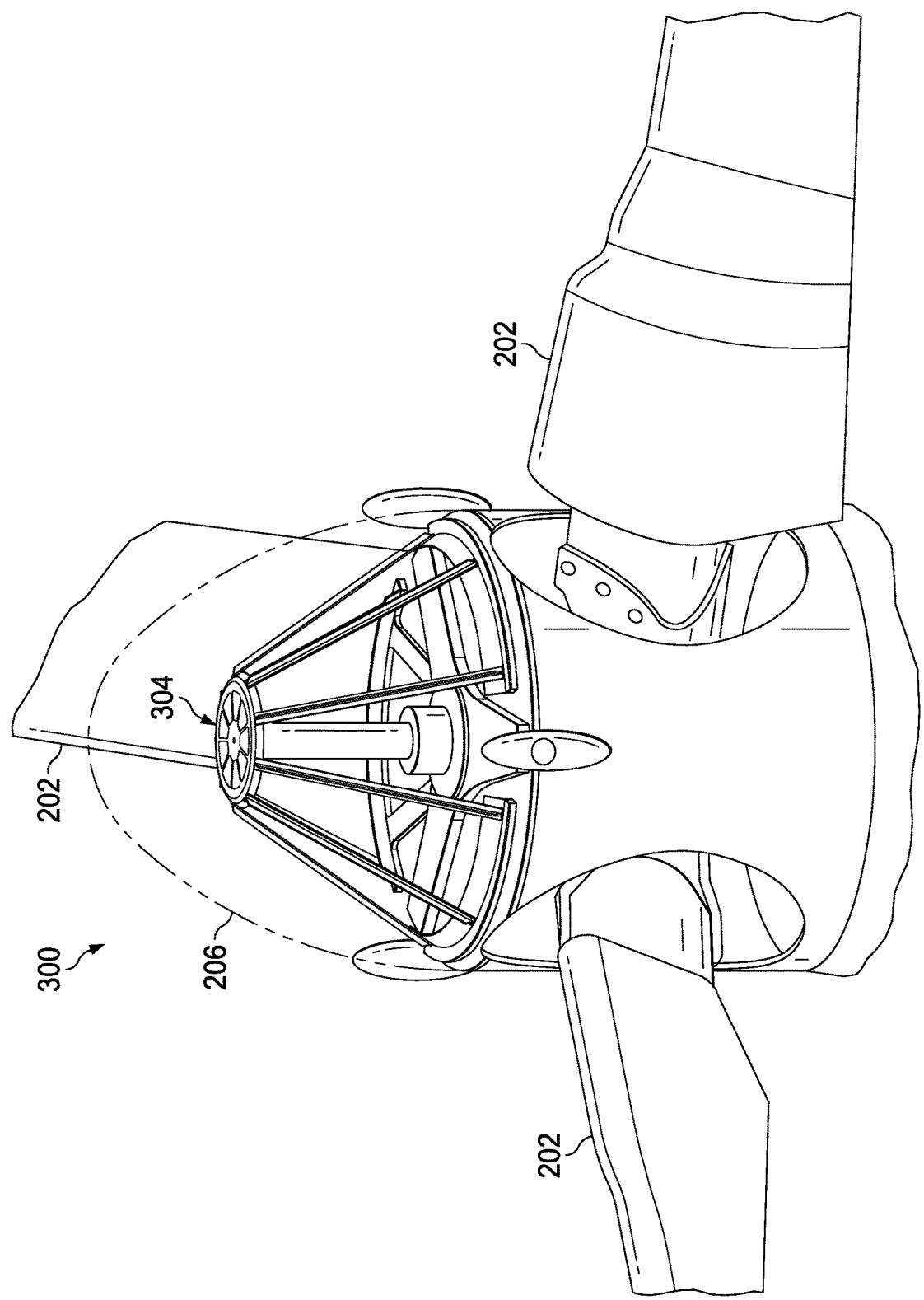
FIG. 5 is a perspective view of a proprotor assembly having a bladed tiltrotor controls shield, in accordance with an embodiment of the present disclosure.

FIG. 5 is a perspective view of a proprotor assembly having a bladed tiltrotor controls shield, generally designated as 300, in accordance with an embodiment of the present disclosure. The proprotor assembly can include a rotor blade 202, a bladed tiltrotor controls shield 304, a transmission fairing 205, and a spinner fairing 206. The spinner fairing 206 is operably coupled to the transmission faring 205, such that the rotor blades 202, the transmission fairing 205, and the spinner fairing 206 rotate together. The bladed tiltrotor controls shield 304 can be coupled to the transmission fairing (via, e.g., a circumferential member) and/or the mast nut (via e.g., a base), with the spinner fairing 206 disposed over the wire tiltrotor controls shield 204 and coupled to the transmission fairing 205. Alternatively, the bladed tiltrotor controls shield 304 can be coupled to the spinner fairing 206.

In operation, if a projectile impacts the spinner fairing 206 with enough force to penetrate the spinner fairing 206, the projectile proceeds through the spinner fairing 206 and strikes the bladed tiltrotor controls shield 304. The blade arms of the bladed tiltrotor controls shield 304 can be spaced (such as 1-5 inches apart at the blade cap) so that when the projectile strikes one or more of the blade arms, the blade arms can separate the projectile into a series of smaller, lower energy objects spread across a wider area. The blade arms can be spaced based upon the specific application. For example, larger aircraft components can withstand greater impact forces and can have greater spacing between blade arms (e.g., 2-3 inches apart at the blade cap). However, smaller aircraft components can withstand lower impact forces that the larger aircraft components, as such the spacing between blade arms must be closer than the larger aircraft components (e.g., 1-2 inches apart at the blade cap). The separated objects can be ejected during flight by the rotational forces or removed by maintenance personnel upon repair of the spinner fairing 206.

Figure 6:
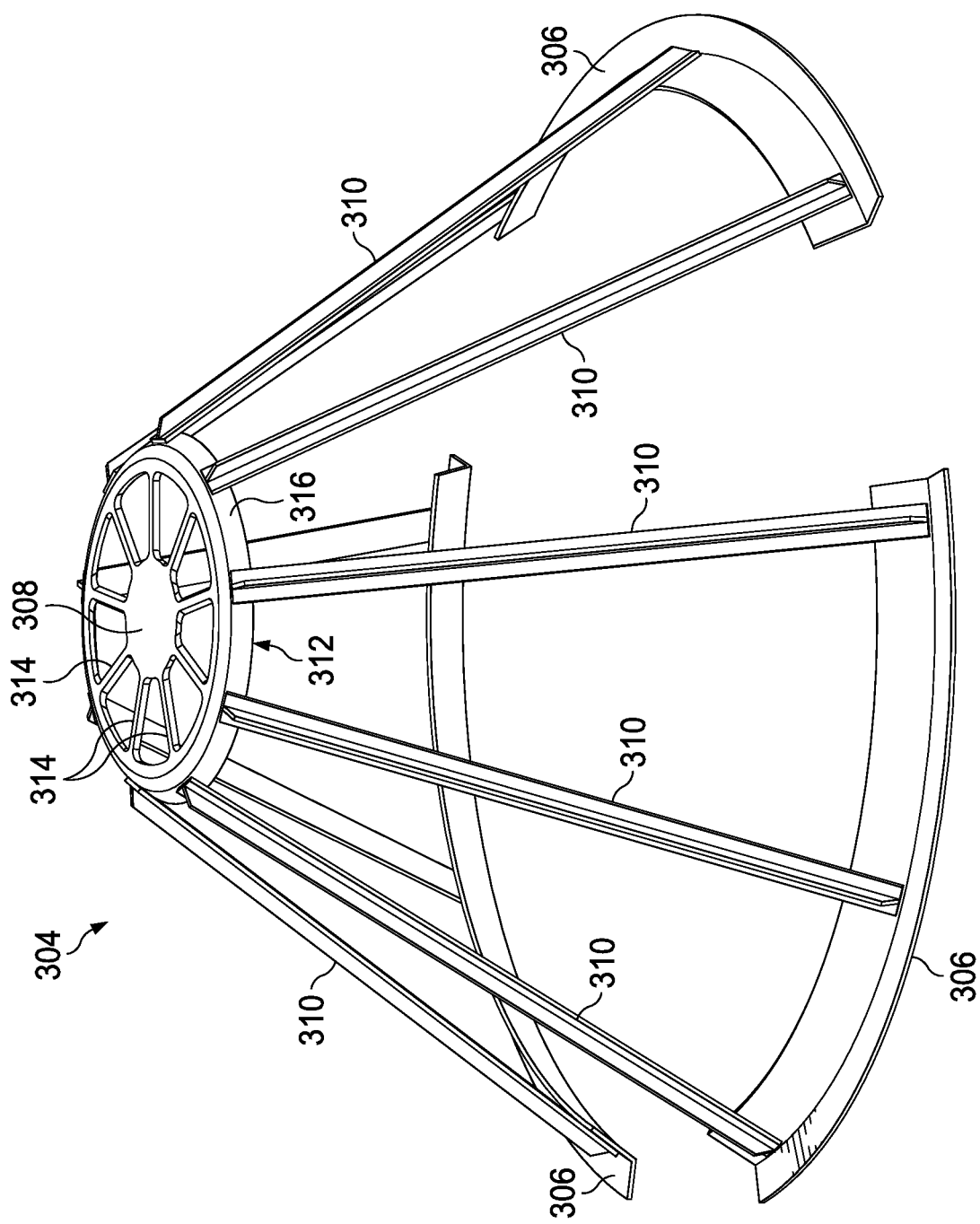
FIG. 6 is a perspective view of a bladed tiltrotor controls shield, in accordance with an embodiment of the present disclosure.

FIG. 6 is a perspective view of a bladed tiltrotor controls shield, generally designated as 304, in accordance with an embodiment of the present disclosure. The bladed tiltrotor controls shield 304 can include a circumferential member 306, a plurality of blade arms 310, and a blade cap 312. The circumferential member 306 can be unitary or segmented into a plurality of member elements. The circumferential member 306 can be circular, rectangular, triangular, or other suitable shape. The circumferential member 306 can include a circumferential member flange to removably couple the bladed tiltrotor controls shield 304 to, an aircraft structure. The circumferential member 306 can be made of metal or other suitable material. The circumferential member 306 can be securely coupled to the blade arms 310 via weld, adhesive, crimp, rivet, bolt, or other suitable coupling mechanism. Alternatively, the circumferential member 306 can have a plurality of notches adapted to receive and engage one or more blade arms 310.

The blade cap 312 can include a blade cap ring 316, one or more blade cap members 314, and a blade cap center 308. The blade cap 312 can be made of metal or other suitable material. The blade cap 312 can be a unitary member or formed using individual components. The blade cap center 308 can be disposed in the center of the blade cap ring 316, with a plurality of blade cap members 314 coupling the blade cap center 308 to the blade cap ring 316. The blade cap members 314 can extend radially from the blade cap center 308, connect opposite points of the blade cap ring 316 in parallel, or other suitable configuration. The blade cap 312 can be securely coupled to the blade arms 310 via weld, adhesive, crimp, rivet, bolt or other suitable coupling mechanism. Alternatively, the blade cap 312 can have a plurality of notches adapted to receive and engage one or more blade arms 310. The height and width of the bladed tiltrotor controls shield 304 can vary based upon the application, fairing dimensions, or other considerations.

A plurality of blade arms 310 can be operably coupled between the cap 212 and the circumferential member 306, and configured to separate a projectile into a plurality of elements. The blade arms 310 can be made of metal or other suitable material. The blade arms 310 can have sharp edges. The blade arms 310 can have three edges, with two edges in a first edge plane and a third edge perpendicular to the first edge plane. The length of the blade arms 310 can vary based upon the desired distance between the circumferential member 306 and the blade cap 312. Alternatively, the bladed tiltrotor controls shield 304 can be formed without the blade cap 312, such that the ends of the blade arms 310 can be securely coupled to each other on the ends opposite the circumferential member 306, via weld, adhesive, bolt, crimp, rivet, or other suitable coupling mechanism. Additionally, the bladed tiltrotor controls shield 304 can allow system pass-throughs to provide clearance for dynamic members.

Figure 7:
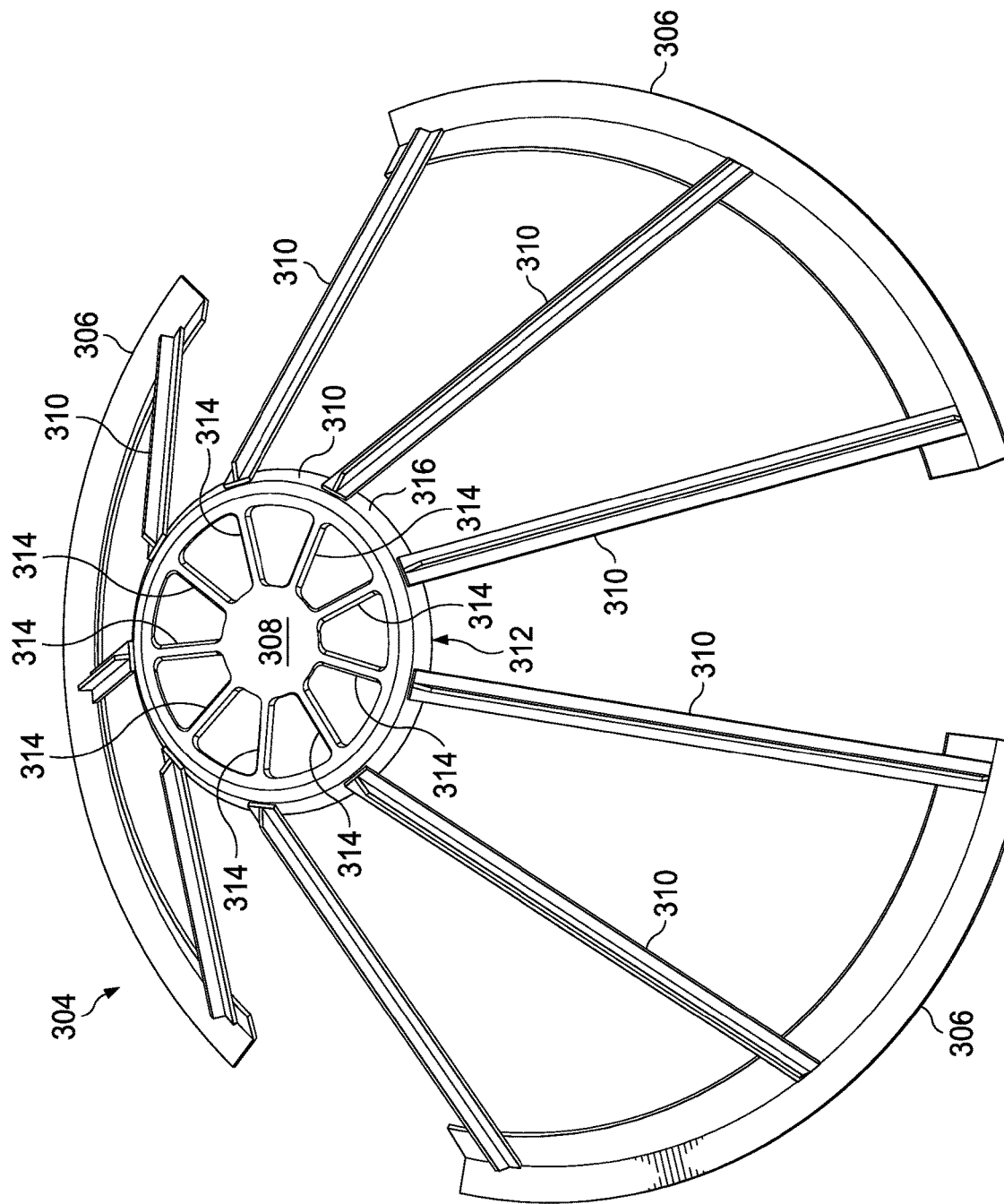
FIG. 7 is a top, perspective view of a bladed tiltrotor controls shield, in accordance with an embodiment of the present disclosure.

FIG. 7 is a top, perspective view of a bladed tiltrotor controls shield, generally designated as 304, in accordance with an embodiment of the present disclosure. The blade arms 310 can be disposed in intervals around the cap 212, or at any location suitable for the specific application. For example, if the designed placement of blades is non-linear, the blade arms 310 can be disposed in a spiral or other pattern for optimal efficiency. In this way, any sector, or groups of sectors of the rotor assembly can be selected to dispose a member element of the circumferential member 306 and blade arms 310.

The present disclosure achieves at least the following advantages:
1. improves bird strike durability using a substructure that can segment a projectile into a series of smaller and lower energy impacts spread across a wider area;
2. provide flexibility of form to accommodate internal rotor assembly components
3. reduce replacement complexity; and
4. reduce costs and aircraft weight associated with traditional bird strike systems.

While the disclosure has described a number of embodiments, it is not thus limited and is susceptible to various changes and modifications without departing from the spirit thereof. In particular, although certain tiltrotor control shield structures were disclosed in some of the embodiments and figures described herein, any suitable structure can be implemented. Persons skilled in the art will understand that this concept is susceptible to various changes and modifications, and can be implemented or adapted readily to other types of environments. Further, the individual elements of the claims are not well-understood, routine, or conventional. Instead, the claims are directed to the unconventional inventive concept described in the specification.

What is claimed is:

1. A wire tiltrotor controls shield, comprising:
a base having a flange on a first end of the base;
a wire cap disposed on a second end of the base;

a vertical member disposed between the flange and the wire cap;

a circumferential member disposed at least in part around the base; and a plurality of wire segments operably coupled between the wire cap and the circumferential member, and configured to separate a projectile into a plurality of elements, wherein the circumferential member is segmented into a plurality of member elements, each member element disposed along a particular arc of a circumference around the base.

2. The wire tiltrotor controls shield of claim 1, further comprising a gusset coupled to the base and the flange.

3. The wire tiltrotor controls shield of claim 1, wherein the base is a hollow structure.

4. The wire tiltrotor controls shield of claim 1, wherein the base has an opening.

5. The wire tiltrotor controls shield of claim 1, wherein the flange is configured to be operably coupled to an aircraft structure.

6. The wire tiltrotor controls shield of claim 1, wherein the circumferential member is configured to be operably coupled to an aircraft structure.

7. The wire tiltrotor controls shield of claim 1, wherein the wire shield is made of metal.

8. The wire tiltrotor controls shield of claim 7, wherein the metal is aluminum.

9. A bladed tiltrotor controls shield, comprising:

a blade cap having a center point in a first plane;

a circumferential member having a center point in a second plane, the circumferential member is segmented into a plurality of member elements, each member element disposed along a particular arc of a circumference around a base of the tiltrotor controls shield; and a plurality of blade arms operably coupled between the blade cap and the plurality of member elements of the circumferential member, and configured to separate a projectile into a plurality of elements, wherein the blade arms have one or more sharp edges.

10. The bladed tiltrotor controls shield of claim 9, wherein the blade cap includes spokes that extend radially from the blade cap center point to a blade cap ring.

11. The bladed tiltrotor controls shield of claim 10, wherein the spokes have one or more sharpened edges.

12. The bladed tiltrotor controls shield of claim 9, wherein the blade arms have at least three edges.

13. The bladed tiltrotor controls shield of claim 9, wherein the circumferential member is configured to be operably coupled to an aircraft structure.

14. The bladed tiltrotor controls shield of claim 9, wherein the bladed shield is made of metal.

15. A tiltrotor controls shield system, comprising:

a spinner fairing;

a proprotor assembly operably coupled to a tiltrotor; and a tiltrotor controls shield having a circumferential member segmented into a plurality of member elements, coupled to the proprotor assembly and covered by the spinner fairing, the tiltrotor controls shield configured to separate a projectile into a plurality of elements.

16. The tiltrotor controls shield system of claim 15, wherein the tiltrotor controls shield includes a plurality of wire segments.

17. The tiltrotor controls shield system of claim 16, wherein the tiltrotor controls shield includes a plurality of bladed arms.

* * * * *